Aug. 18, 1936.   H. H. PARKER   2,051,315
PRESSURE COMPENSATOR FOR PNEUMATIC TIRES
Filed April 9, 1936   2 Sheets-Sheet 2
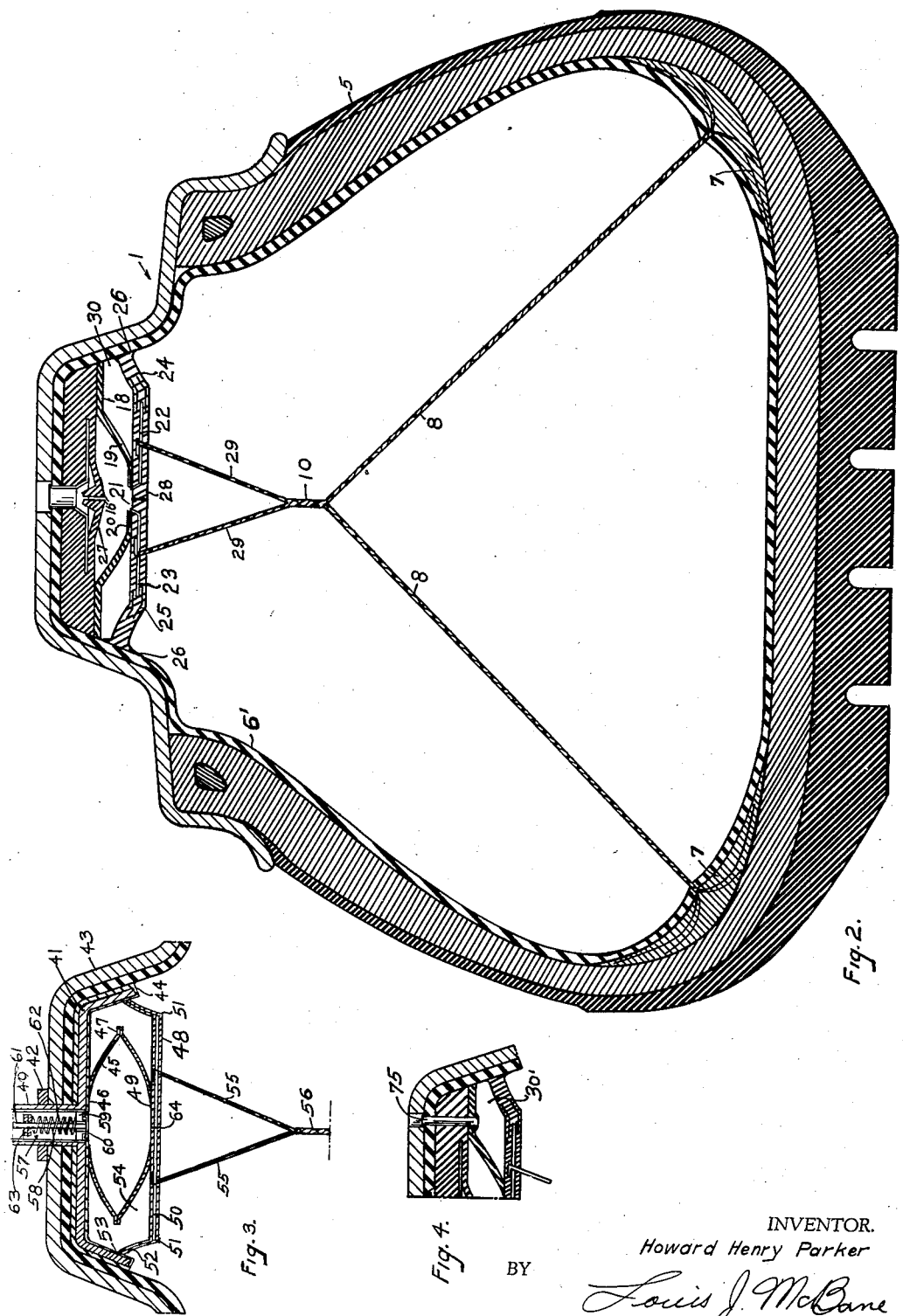
INVENTOR.
Howard Henry Parker
BY
ATTORNEY.

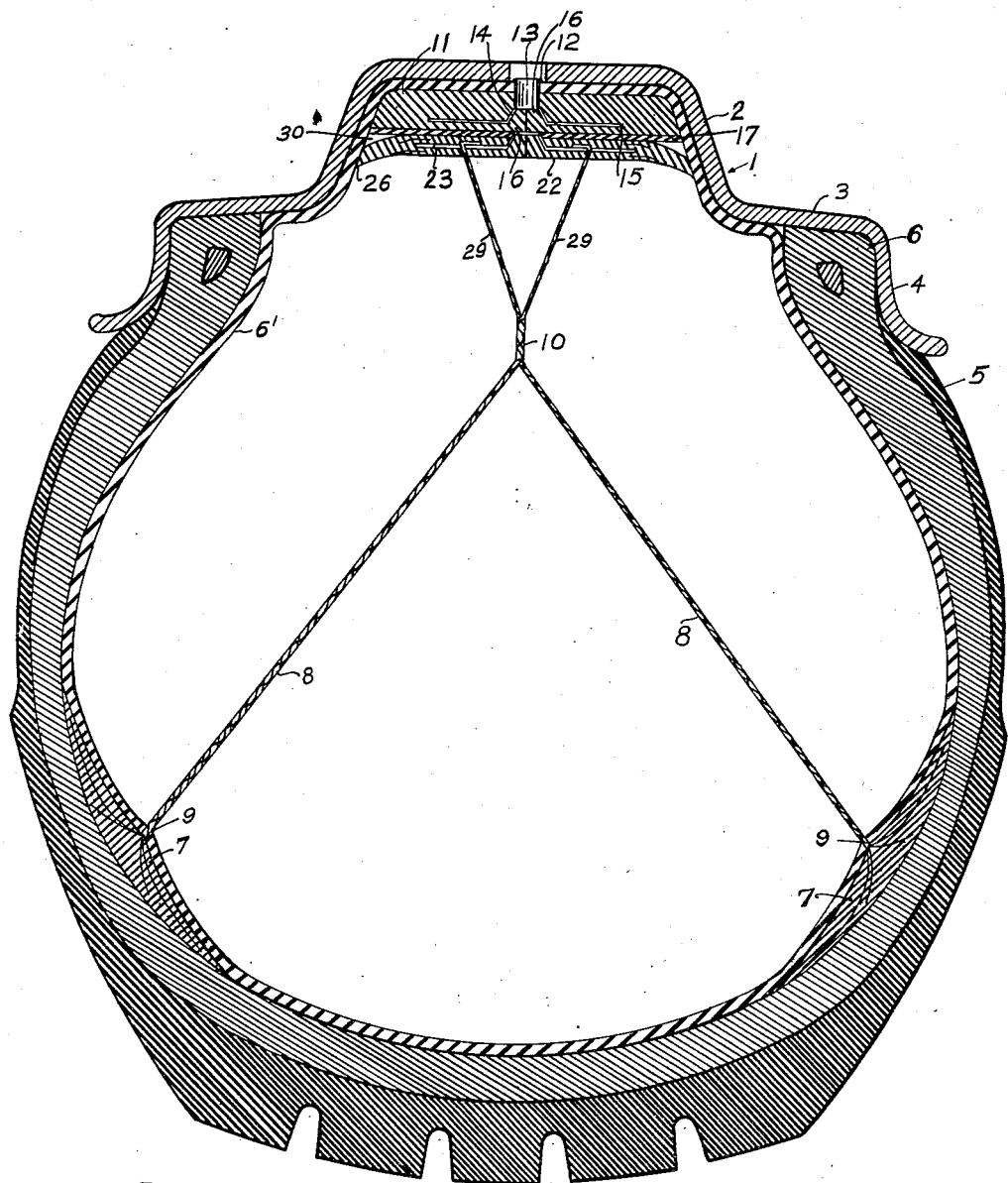

Patented Aug. 18, 1936

2,051,315

UNITED STATES PATENT OFFICE 2,051,315

PRESSURE COMPENSATOR FOR PNEUMATIC TIRES

Howard Henry Parker, Cleveland, Ohio

Application April 9, 1936, Serial No. 73,550

15 Claims. (Cl. 152—11)

This invention relates to a pneumatic tire inflating device.

More particularly, this invention relates to an inflating device in combination with a pneumatic tire and operable to inflate the tire during use so as to maintain a predetermined pressure within the tire.

The inflating device of this invention is not intended to compensate for leaks due to punctures or bad valve defects. It is intended to compensate for the normal loss of air pressure common to all automobile tires and to maintain substantially the air pressure in all the tires of a vehicle.

An automobile tire makes many millions of revolutions during its life. An inflating device, in combination with the tire, is subject to severe wear. It is desirable to reduce the wear on the inflating device to only such as is necessary for maintaining the tire fully inflated. It is an object of this invention to provide a novel tire inflating device, in combination with a vehicle tire, adapted to undergo substantially no actuation when the tire is fully inflated.

The inflating device of this invention is intended to pass through a cycle of operation with each revolution of the tire. To actuate the device with every tire revolution would impose severe wear on the device. It is an object of this invention to provide a novel tire inflating device which operates through a complete cycle with each tire revolution at moderate speeds of vehicle movement only, and which ceases to function at high speeds, when a tire is fully inflated, and also when a tire is under-inflated to a predetermined degree, thereby minimizing undue wear.

Only a small part of the circumference of a tire, an automobile tire for example, touches the pavement at any time. Where the deformation of the tire, due to its under-inflated condition, upon engagement with the pavement, is utilized for causing operation of the inflating device, a large force of relatively short duration becomes available for actuating the device. The duration of the force is short because, even at moderate speeds, any particular portion of the tire is in contact with the pavement for only a small fraction of a second.

Where the fluid pressure within the tire, exerted upon a diaphragm, the movement of which is resisted by air within the device, is used for actuating the inflating device, that force is small due to the fact that a differential between forces derived from fluid pressures, only is available. Also, that force is elastic in its nature and tends to be slow in operation. The transfer of air, drawn from the atmosphere into the inflating device, to the interior of the tire may proceed slowly and under moderate force with advantage.

It is an object of this invention to provide a novel tire inflating device actuated by the large force associated with tire deformation and actuated by the small force associated with fluid pressure differentials across a diaphragm, the large force acting upon the device for only the period of time required for a particular small area, less than the area of road contact, to pass through road contact, the small force acting upon the inflating device throughout the whole of the remainder of the period of time of a tire revolution.

It is also an object to utilize the large force, of short duration, to effect intake of air from the atmosphere into the inflating device and to utilize the small force, of relatively long duration, to effect exhaust of air from the device into the tire interior.

It is an object of this invention to provide an inflating device of the diaphragm type that is small and light, that is arranged within the pneumatic tire, that has no protruding parts which would jab, cut or tear an inner tube or tire casing if the tire should become flat while the vehicle is in operation.

It is an object of this invention to provide a novel tire inflating device operable to inflate a pneumatic tire to a standard pressure, which is operable on deformation of an under-inflated tire, which undergoes little or no actuation upon normal deformation of a fully inflated tire, which is actuated but slightly by deformation of a fully inflated tire when the vehicle is overloaded.

Other objects and advantages of the present invention will appear in the following detailed description taken in connectiion with the accompanying drawings in which:

Figure 1 is a view in cross section, of the tire inflating device in combination with an automobile tire.

Figure 2 is a view, in cross section, of the device shown in Figure 1, in another position of actuation.

Figure 3 is a detailed view, in cross section, of a modified form of an inflating device.

Figure 4 is a detailed view, in cross section, of another modification.

The inflating device operates by intake of air from the atmosphere to an air pocket within the device and exhaust of air from the pocket into the tire interior. A valve separates the atmosphere and the air pocket. A diaphragm separates the air pocket and the tire interior. The valve is constructed to remain closed and a pressure differential across the valve, due to atmospheric pressure on one side of the valve and less than atmospheric pressure on the other side, is required to open the valve to admit air into the air pocket. This differential pressure across the valve, effective for actuating it, is a minimum force relative to which other actuating forces must be larger.

The pressure differential across the valve is created by displacement of the diaphragm to reduce the air pressure within the air pocket. That movement of the diaphragm is against the fluid pressure in the tire interior. The diaphragm is much larger than the valve. The force which must be exerted on the diaphragm, to open the air intake valve, is many time larger than the pressure differential across the valve.

The force for displacing the diaphragm to open the intake valve is derived from the fluid pressure in the tire interior. A description of the structure for providing that force follows.

Referring to Figure 1, the rim of an automobile wheel is indicated at 1, and consists of annular well 2, shoulder 3, and flange 4. An automobile tire 5 is mounted on the rim 1, the bead portion 6 filling shoulder 3 within the flange 4. The tire is provided with the inner tube 6'.

The contour of the tire, as illustrated in Figure 1, may be regarded as either of two conditions. It is the shape of some portion of the tire, not in contact with the road when the tire is in under-inflated or in inflated condition.

The force for actuating the diaphragm on air intake stroke is exerted through connection members 7. The members 7, or their equivalent, may be mounted in combination with the tire in a variety of ways, within the purview of this invention. As shown, the members 7 are arranged between the inner tube 6' and the inner wall of the tire casing 5. They may be adhesively united or vulcanized to the outside of the inner tube and form a unit with the inner tube. Flexible connections 8, desirably of fabric, lead from the members 7 to the inflating device. The flexible connections 8 extend through apertures 9 in the inner tube 6'. The members 7 close the apertures 9 so that leakage through those apertures cannot occur.

Members 7 are of a shape to conform to the side-walls of the tire, each tapering from thin edges to a comparatively massive central portion, to distribute the load, exerted on the connections 8, throughout the whole area of the members. The members 7 may extend along the side-walls of the tire in a circumferential direction, for a length considerably greater than the width, as shown in Figure 1.

The air pressure within the tire acts, through the wall of the inner tube, on the members 7, the latter being confined by the tire casing. The fluid pressure on the members 7 provides the force for actuating the diaphragm through air intake displacement. The fluid pressure on the members 7 is the same as that upon the diaphragm. To provide adequate force, the members 7 are each large enough to afford an effective pressure area, approximating or greater than the effective pressure area of the diaphragm. The resultant of the forces from each member 7 approximates or is greater than twice the force necessary to actuate the diaphram on intake stroke. The particular ratio of those forces is not of the essence of the invention, it being important only that the force exerted through members 7 be adequate.

When the tire casing deforms, the members follow the movement of the casing. The members are contrained to follow that movement by the fluid pressure within the inner tube. When the tire is fully inflated, or when the inflating device is out of road contact position, the parts are in the position illustrated in Figure 1, where the distance between members 7 is a minimum. When the tire is under-inflated and when that portion of the tire, which is combined with the inflating device, engages the road, the tire spreads to a form such as that illustrated in Figure 2. Such deformation of the tire casing moves the members 7 a distance apart greater than that shown in Figure 1. The connections 8 join as indicated at 10. The relative lateral movement of the members 7 draws the joint 10 downwardly, as shown in Figures 1 and 2, so that the distance between the level of the members 7 and the joint 10 decreases. If the joint 10 and the members 7 are thought of as being the corners of a triangle, the relative lateral movement of the members 7 causes the joint 10 to approach the side of the triangle between the members 7. This movement is the consequence of the arrangement of members 7 at substantially opposite locations relative to the center of the tire tread and to the location of joint 10, the members 7 being arranged at proper locations with respect to tire tread and side walls, the arrangement of those parts shown in Figures 1 and 2, is illustrative of such proper locations of the joint and the members. Variations in those locations may be made to adapt the device to various tire casings, to vary the stroke of diaphragm movement and to accomplish other objectives later to be described.

Flexing of the tire casing, due to its under-inflated condition, also causes the tire tread, and the members 7 as well, to approach the rim 1. The amount of movement of joint 10, due to the relative lateral movement of members 7, may be varied by arranging the joint 10 at various locations relative to the members 7. Such a location may be chosen, as illustrated in Figures 1 and 2, so that the movement of joint 10, due to relative lateral movement of members 7, will be greater than the movement of members 7 and joint 10, toward the wheel rim, due to flattening of the tire casing. This relative movement between the joint 10 and the rim 1 of the wheel, and the force causing it, are utilized for actuating the inflating device through the air intake stroke.

One form of inflating device, as shown in Figure 1, consists of a base 11, which may be of vulcanized rubber, and may contain suitable stiffening substances or inserts. The base 11 is secured to the inner wall of the inner tube 6 and may be vulcanized in place or mounted by an adhesive. An insert 12 forms a part of base 11 and consists of the tubular portion 13 arranged to extend from the base 11 through the inner tube 6, into proximity to an opening in rim 1, to constitute an air duct. Tubular portion 13 is flared to form the valve seat 14, from which the margin 15 extends laterally and is embedded in the rubber. The material of base 11 is free from the margin 15, at a region surrounding the valve seat 14, and is formed to provide the tongues of a valve 16. The resilience of the rubber forming the tongues of the valve 16 tends to keep the valve closed. Spring means, such as strip springs (not shown) embedded in the rubber, may be provided to aid in urging the tongues of the valve 16 to closed position.

An air impervious membrane 17, desirably of elastic rubber, is united with the base 11 at its outer margins as indicated at 18. The intermediate portion of membrane 17 is free as indicated at 19; and the inner margins 20, surrounding the opening 21 in membrane 17, are united to a diaphragm 22. The membrane may be connected with the base and diaphragm by vulcanizing or by adhesives. This structure constitutes the air pocket.

Diaphragm 22 is provided with an insert 23, which may be of sheet metal, to stiffen the central area of the diaphragm. The diaphragm may be of any suitable air imperious material such as vulcanized rubber in which the insert 23 may be embedded. The diaphragm 22 is flexible at its outer margins as indicated at 24 and fabric inserts 25 may be embedded in the material of the diaphragm to strengthen it at the edges of the rigid insert 23. The diaphragm 22 is connected as indicated at 26 to the inner wall of the inner tube 6. The insert 23 is shaped to provide a conical valve seat 27 at its center. The material of the diaphragm 22 is free from the insert 23, at a region immediately surrounding the conical valve seat 27, and it is shaped to provide the tongues adapted to engage with the seat 27 and to constitute a valve 28. The resilience of the material tends to keep valve 28 closed.

The diaphragm 22 is connected with the joint 10 by fabric strips 29, the ends of which are embedded in the material of the diaphragm 22, and may extend through and engage the insert 23 so as to transmit the force from joint 10 directly to the insert 23.

In mounting the inflating device in the inner tube, parts are arranged in flat position as indicated in Figure 1, in which position, during operation, there is no strain on the parts and all fluid pressure acting on the diaphragm 22 is supported by the body 11. Due to the closed position of the diaphragm 22, when it is being mounted, a vacuum pocket 30 is provided between the diaphragm 22 and the membrane 17. Since the parts, when united, completely close the pocket 30 to air from either the atmosphere, the inflating device, or the inner tube, no air gains access to the pocket 30. It remains a vacuum pocket at all times.

With the parts in the position illustrated in Figure 1, the distance between the members 7 is a minimum and the diaphragm 22 is at rest against membrane 17 and base 11. The air pocket collapses completely and the membrane ties flat against the base and the valve 16, there being no space in which residue air may remain. The connections 8 may be of such length that they are barely held taut when the parts are in the position illustrated in Figure 1, there being very little strain upon the diaphragm 22.

According to the degree of under-inflation, as the part of the tire casing illustrated in the drawings engages the road, relative lateral movement of members 7 occurs and actuation of the inflating device takes place. When the diaphragm is at rest, fluid pressure within the inner tube acts upon the whole face of the diaphragm and is not resisted by fluid pressure on the opposite side, the diaphragm being supported by the base 11 and there being very little air in the vacuum pocket 30. The area of the diaphragm 22 and the fluid pressure within the inner tube are such that a considerable force is required to displace the diaphragm downwardly, as shown in the drawings, against the fluid pressure. As the portion of the tire shown in the drawings passes the road contact position, the tire, being under-inflated, flexes under the load of the car. Members 7 follow the tire deformation and adequate force for actuating the diaphragm, against the fluid pressure on it, is provided by the force of the fluid pressure on the members. This action occurs within a small fraction of a second so that comparatively large force is exerted with a jerk through the connections 8 on the inflating device. The members 7 are large enough so that the air pressure exerted upon them is adequate to overcome all inertia of the moving parts while transmitting the force through the connections 8 for displacing the diaphragm 22.

When the diaphragm 22 is displaced, atmospheric pressure acts to open the valve 16 and air enters the air pocket formed by membrane 17, base 11, and diaphragm 22. Fluid pressure within the inner tube maintains the valve 28 closed. The actuation of the inflating device, at slow and moderate speeds of vehicle travel, creates a differential of pressure across the valve 16 so that it opens to admit air. Then, the valve 16 resumes its original closed position to close the air pocket to the atmosphere.

During the remainder of the revolution of the wheel, the tire casing assumes the position as shown in Figure 1 and all tension is relaxed in the connections 8 so that they may hang loosely so long as the diaphragm remains in displaced position. The fluid pressure within the inner tube acts upon the face of the diaphragm 22 tending to force the air from within the membrane 17 through valve 28 into the inner tube. The effective area of diaphragm 22 is greater than the effective area of the air pocket, due to the difference in size of those parts and due to the presence of vacuum pocket 30, so that a force is exerted on the diaphragm tending to restore it to the collapsed position. The result is that the fluid pressure within the air pocket is raised considerably above that obtaining within the inner tube 6. Consequently, air is forced out of the air pocket, through the valve 28, and into the tire interior.

Up to a certain limit, the actuation of the inflating device, consequent upon relative lateral displacement of members 7, increases with increasing degree of under-inflation. Consequently, the greater the under-inflation, the greater the inflating action of the device. As the air pressure within the tire increases, the magnitude of relative lateral displacement of members 7 diminishes and the inflating action of the device grows progressively less. Thus, the device operates to inflate the tire most rapidly when the need is the greatest and the inflating action tapers off as the air pressure approaches standard.

Two actuating forces are involved in the operation of the inflating device. One force, derived from the fluid pressure within the tire upon connection members 7, is large. The other force, derived from the differential between fluid pressures acting on the diaphragm 22, is much smaller. The device of this invention uses those forces most effectively, the difference in magnitude being taken into account.

There are two alternate operating positions of the inflating device relative to the tire; road contact position of that part of the tire adjacent to members 7, and out-of-road contact position of that same part. In a single revolution of an automobile tire, the time of road contact of that part of the tire is about 5% of the period of revolution, while the time of non-road contact movement of the same part is about 95% of the period of revolution. Thus, the two operating positions have time periods in the ratio of about one to twenty.

For example, consider the action of a tire on an automobile traveling about twenty miles per hour. The period of revolution of a tire of common size is in the order of one-fourth of one second. The time of road contact of the actuating part of the tire is of the order of one-eightieth of one second. The time during which the same part of the tire is out of road contact is in the order of one-fourth of one second less the time of road contact.

The two actuating forces are used most effectively by causing the large force to actuate the inflating device during the shorter time and by causing the small force to actuate the device during the longer time. The device of this invention so operates. The arrangement of the members 7 at opposite sides of the center of the tire tread and the operation thereof, before described, upon tire deformation during road contact, places the larger of the two forces into operation for actuating the inflating device and that event occurs incident to and only during movement of the members 7 through road contacting position. As soon as the members 7 leave road contact position, the fluid pressure within the tire, acting on diaphragm 22, becomes effective for the remainder of the tire revolution.

This mode of operation of a tire inflating device, whereby a large force acts suddenly and a comparatively small force acts for a comparatively great period of time, both forces being derived from the fluid pressure in the tire interior, the forces being initiated by and being under the control of the deformation of the tire at road contact, is believed to be new to this art.

The foregoing description is concerned with the operation of the device of this invention in connection with a moderately under-inflated tire, loaded within normal limits, and moving at moderate rates of speed. The actions incident upon high speed travel, very slow speed travel, excess under-inflation, excessively loaded tires, and standard pressure in the tire, will be described subsequently.

A modified form of the invention is illustrated in Figure 3. The inflating device may be entirely independent of the usual valve stem for inflating a tire, as in Figures 1 and 2, or it may be in connection with such a valve stem as shown in Figure 3. The valve stem 40 may be of conventional construction and has a base 41, integral therewith, to be arranged within the inner tube. A nut 42 may be provided for securing the valve stem tightly to the rim 43. The rigid base 41 of the valve stem affords a convenient base for the inflating device. The base 41 may be embedded in vulcanized rubber 44, if desired, to afford suitable connecting material for securing the inflating device to the base. A flexible bag 45, which may be of rubberized fabric, is secured to the base 41 as indicated at 46, there being an aperture in the fabric within the margins where the bag is secured to the base 41. The bag 45 may be made of two halves united at a seam 47. The material of the bag 45 may be non-extensible but highly flexible. The bag 45 is secured to a diaphragm 48 as indicated at 49. Diaphragm 48 may consist of a rigid insert, of metal or the like, arranged between sheets of rubberized fabric 51, which extends beyond the margins of the insert 50 to form flexible portions 52 joined to the base 41 as indicated at 53. The space 54 between the base 41 and the diaphragm 48, and outside of bag 45 is substantially empty of air and constitutes a vacuum pocket. The diaphragm 48 is connected with the tire by flexible strips 55 leading to joint 56, in the same manner as illustrated in Figures 1 and 2. The bag 45 is an air pocket as specified in the claims.

The stem 40 of the valve is provided with a sleeve 57 threaded for insertion and removal into and from the stem. The sleeve 57 carries the valve insides 58. A valve seat 59 is arranged in the lower end of the tube 57 and is engaged by a valve 60. Stem 61 extends through the seat 59 and connects with the valve 60, there being a spring 62 surrounding the stem 61 and pressing at one end against the seat 59 and at the other end against collar 63, adjustable along stem 61. The valve insides 58 is similar to the conventional valve insides commonly used for automobile tires at present, except that the parts are rearranged to place the spring above the valve and valve seat, and to place the valve at the end of stem 40. It is desirable to arrange the valve at the end of the stem 40 so that, when the inflating device is moved to closed position, there will be no air space within the valve stem on the side of the valve adjacent to the air pocket.

The operation of the device in Figure 3 is similar to that of Figures 1 and 2. When road contact of that portion of an under-inflated tire, which is connected for operation of the inflating device, occurs, the spreading action of the tire casing causes the diaphragm 48 to be jerked downwardly, as shown in Figure 3, to move the parts to the position illustrated in Figure 3. When that action occurs, atmospheric pressure opens the valve 60 and air enters the air pocket or bag 45. This action occurs quickly and the valve 60 closes an instant later to trap the air in the bag 45. When the operating part of the tire casing passes road contact position, the force upon the diaphragm 48, through straps 55, is relieved, and for the remainder of the revolution of the wheel, the fluid pressure within the inner tube acts upon the diaphragm 48 to compress the air in bag 45. The effective area of the diaphragm 48 is greater than the effective area of the bag 45, due to the difference in sizes of those parts and due to the presence of the vacuum pocket 54.

An aperture 64, open at all times, is provided in the diaphragm 50, and connects the space within the bag 45 with the tire interior. The aperture 64 replaces a valve, such as valve 28, Figure 2, and is desirable because of its effect on the operation of the device of Figure 3 when operating at high speed of vehicle travel.

As the speed of travel of the automobile or other vehicle increases, the time interval between successive road contact of the actuating part of the tire decreases. At high speeds, that interval becomes too short to permit full return of the diaphragm. The device remains more or less distended, depending on the speed of vehicle travel and the operating characteristics of the device. The diaphragm may remain substantially fully distended and flutter slightly at that position.

When the device of Figures 1 and 2 is operated at high speed, the action last described occurs. The pressure within the air pocket remains partly reduced, in a degree depending upon the operation of valve 16 incident to the change from moderate to high speed travel, and substantially the full actuating force, due to air pressure on the diaphragm, is exerted. The diaphragm 22 flutters under the influence of both actuating forces, the amplitude of fluttering movement tends to be large and the wear on the device is undesirably great.

When the device of Figure 3 is subjected to high speed operation, the aperture 64 operates greatly to relieve the strains and wear on the device. As the vehicle speed increases and the interval between diaphragm displacements by the larger of the two actuating forces diminishes, the diaphragm 48 oscillates between fully distended position and increasingly large partially distended positions. The aperture 64, being open, permits air to flow from the tire into the air pocket to establish tire pressure within the air pocket. This action takes place regardless of any actuation of the valve 60, due to the movement of the diaphragm 48. Thus, the actuating force tending to return the diaphragm to initial position is reduced and the diaphragm tends to assume fully distended position where the force associated with tire deformation has minimum effect. The diaphragm flutters but slightly in fully distended position, the opposing forces on it are reduced, and wear on the device, due to high speed vehicle travel, is minimized.

At moderate speeds of vehicle travel, the movement of the diaphragm by the larger of the two actuating forces is so sudden that a reduced pressure is created within the air pocket, adequate to cause opening of the valve 60, before air, sufficient materially to reduce the pressure differential across the valve 60, can flow from the tire through the aperture 64. The return movement of the diaphragm 48, by the fluid pressure on it, proceeds at a comparatively slow rate over a comparatively long period of time so that the air in the air pocket passes through the aperture 64 into the tire interior, inflating the tire.

At extremely slow speeds of vehicle travel, the movement of the diaphragm 48, on air intake actuation, is so slow that air from the tire will flow through the aperture 64 instead of the valve 60 being opened. When starting a vehicle from rest, the diaphragm 64 may be collapsed completely and, if the tire be under-inflated considerably, the first stroke of the diaphragm may be large with consequent tendency to create large strains. The aperture 64, together with the slow movement of the diaphragm, under such conditions, relieves excessive strain on the device.

Thus, the aperture 64 acts to relieve strains on the device when the vehicle is starting, the aperture acts similarly to a valve at moderate speeds, and the aperture operates to relieve strains and wear on the device at high speeds of vehicle travel. In addition, the provision of aperture 64 in diaphragm 48 is a simple, reliable, and enduring structure.

Figure 4 shows a further modification of the inflating device. This figure shows the inflating device of Figure 1, like the latter in all respects, except that a passage 75 is provided for connecting the space 30', around the air pocket and between the base and diaphragm, to atmosphere. This enables that space to breathe and to eliminate any back pressure against the diaphragm. Breathing of the space 30' provides atmospheric pressure to that space when the inflating device is held in distended position due to high speed operation, as before described, thus further reducing strains and wear on the device. The passage 75 to the space 30' prevents accumulation of air in that space due to seepage of air through the materials of the walls over a long period of time.

The mode of operation of the inflating device, of either type shown in the drawings, when provided with a passage 75, is the same as when the spaces 30 or 54 remain vacuum pockets, except that the operating characteristics are modified. There is less resistance to intake movement of the diaphragm, and less force available for the return stroke of the diaphragm. And, strains on the diaphragm are relieved when it is held in distended position during high speed vehicle travel.

Control of the rate at which the device will pump air may be effected by adjustment of the intake valve, the tension of spring 62, for example, or by predetermining the size of the aperture 64, or by predetermining or adjusting the size of the passage 75, or by two or more such adjustments.

The inflating device may have an intake valve of either type shown in Figures 1 or 3, either an exhaust valve or an aperture 64, either a vacuum space around the air pocket or a similar space with a passage to breathe to the atmosphere. Any combination of the foregoing alternate features may be combined in an inflating device of this invention.

If the tire should be excessively under-inflated, the point where there is no more relative movement between members 7 may be passed and actuation of the inflating device will cease. This is desirable in that excessive wear on the device, by excessive under-inflation, is avoided. Also, members 7 are well below the centers of the side walls of the casing so that, if the tire should become flat, the length of the connections is such that they will be loose and not torn out. It is not intended to compensate for the condition of an excessively under-inflated tire by the device of this invention.

The nut 63 is adjustable on the stem 61 to control the tension of spring 62, thereby to load the valve as may be desired. By so loading the valve 60, the magnitude of pressure differential across the valve 60 necessary to open the valve, upon intake displacement of diaphragm 48, may be adjusted to any value desired, within the limits essential to proper operation of the device. By regulating the load upon valve 60, the minimum displacement of diaphragm 48, from collapsed position, necessary to effect air intake through valve 60, may be adjusted. Thus, a minimum actuation of diaphragm 48, by relative lateral displacement of pressure members 7, is predetermined. From the foregoing, it will be apparent that adjustment of nut 63 on stem 61 predetermines the degree of inflation beyond which the device of this invention will no longer operate to inflate the tire, even though some deformation of the tire casing may cause slight displacement of diaphragm 48, less than the minimum above mentioned.

Certain advantages are inherent in the location of members 7, in addition to the manner in which those members coact to provide the actuating force for air intake. The members 7 must be stiff, as compared to tire stiffness, to convert the fluid pressure into actuating force. Since there are two members, the area of each may be small with consequent little effect on flexing of the tire. Also, when a tire is fully inflated, some flexing at the tread occurs at road contact, but such flexing causes little or no flexing of the side walls. Since the members 7 are removed from the central part of the tread, and disposed at or adjacent to the side walls, little or no movement of the tire casing at those regions occurs during flexing of the fully inflated tire. This relieves the tire and the inflating device of wear a large part of the time, and stops operation of the device when the tire is fully inflated. Also, if a fully inflated tire be overloaded, so as to cause deformation of the tire, the resultant movement of the side walls is not so great as the deformation of the tread so that overinflation of the tire is reduced to a minimum.

The device of this invention is small, compact, light in weight, and has no protuberances which would jab, cut, or tear the tire if it became wholly deflated while the vehicle was moving. The structure operates with very little frictional force, makes efficient use of the actuating forces, and functions with a minimum of wear.

The invention has been described in detail by way of illustration. Variations in the details of construction, apparent to one skilled in the art, may be made without departing from the scope of the invention defined in the following claims.

What I claim as my invention is as follows:

1. In combination, a wheel for a vehicle, a pneumatic tire mounted on the wheel, connections with the tire arranged in spaced relation in substantially opposite positions relative to the center of the tire tread, a joint between the connections arranged for movement by relative lateral displacement of the connections, a diaphragm mounted for displacement in the tire, means uniting the diaphragm and joint, a base, an air pocket arranged between the base and the diaphragm, a vacuum space around the air pocket between the base and diaphragm, valve means for admitting air to the pocket, and means for discharging air from the pocket into the tire.

2. In combination, a wheel for a vehicle, a pneumatic tire mounted on the wheel, connections with the tire arranged in spaced relation in substantially opposite positions relative to the center of the tire tread, a joint between the connections arranged for movement by relative lateral displacement of the connections, a diaphragm mounted for displacement in the tire, means uniting the diaphragm and joint, a base, an air pocket arranged between the base and the diaphragm, a vacuum space around the air pocket between the base and diaphragm, valve means for admitting air to the pocket, a valve mounted in the diaphragm for discharging air from the pocket into the tire.

3. In combination, a wheel for a vehicle, a pneumatic tire mounted on the wheel, connections with the tire arranged in spaced relation in substantially opposite positions relative to the center of the tire tread, a joint between the connections arranged for movement by relative lateral displacement of the connections, a diaphragm mounted for displacement in the tire, means uniting the diaphragm and joint, a base, an air pocket arranged between the base and the diaphragm, a vacuum space around the air pocket between the base and diaphragm, valve means for admitting air to the pocket, an open passage through the diaphragm connecting the air pocket to the space within the tire.

4. In combination, a wheel for a vehicle, a pneumatic tire mounted on the wheel, connections with the tire arranged in spaced relation in substantially opposite positions relative to the center of the tire tread, a joint between the connections arranged for movement by relative lateral displacement of the connections, a diaphragm mounted for displacement in the tire, means uniting the diaphragm and joint, a base, an air pocket arranged between the base and the diaphragm, valve means for admitting air to the pocket, and means for discharging air from the pocket into the tire.

5. In combination, a wheel for a vehicle, a pneumatic tire mounted on the wheel, connections with the tire arranged in spaced relation in substantially opposite positions relative to the center of the tire tread, a joint between the connections arranged for movement by relative lateral displacement of the connections, a diaphragm mounted for displacement in the tire, means uniting the diaphragm and joint, a base, an air pocket arranged between the base and the diaphragm, valve means for admitting air to the pocket, a valve mounted in the diaphragm for discharging air from the pocket into the tire.

6. In combination, a wheel for a vehicle, a pneumatic tire mounted on the wheel, connections with the tire arranged in spaced relation in substantially opposite positions relative to the center of the tire tread, a joint between the connections arranged for movement by relative lateral displacement of the connections, a diaphragm mounted for displacement in the tire, means uniting the diaphragm and joint, a base, an air pocket arranged between the base and the diaphragm, valve means for admitting air to the pocket, an open passage through the diaphragm connecting the air pocket to the space within the tire.

7. In combination, a wheel for a vehicle, a pneumatic tire mounted on the wheel, connections with the tire arranged in spaced relation in substantially opposite positions relative to the center of the tire tread, a joint between the connections arranged for movement by relative lateral displacement of the connections, a diaphragm mounted for displacement in the tire, means uniting the diaphragm and joint, a base, an air pocket arranged between the base and the diaphragm, a space around the air pocket between the base and diaphragm, said space being open to the atmosphere, valve means for admitting air to the pocket, and means for discharging air from the pocket into the tire.

8. In combination, a wheel for a vehicle, a pneumatic tire mounted on the wheel, connections with the tire arranged in spaced relation in substantially opposite positions relative to the center of the tire tread, a joint between the connections arranged for movement by relative lateral displacement of the connections, a diaphragm mounted for displacement in the tire, means uniting the diaphragm and joint, a base, an air pocket arranged between the base and the diaphragm, a space around the air pocket between the base and diaphragm, said space being open to the atmosphere, valve means for admitting air to the pocket, a valve mounted in the diaphragm for discharging air from the pocket into the tire.

9. In combination, a wheel for a vehicle, a pneumatic tire mounted on the wheel, connections with the tire arranged in spaced relation in substantially opposite positions relative to the center of the tire tread, a joint between the connections arranged for movement by relative lateral displacement of the connections, a diaphragm mounted for displacement in the tire, means uniting the diaphragm and joint, a base, an air pocket arranged between the base and the diaphragm, a space around the air pocket between the base and diaphragm, said space being open to the atmosphere, valve means for admitting air to the pocket, an open passage through the diaphragm connecting the air pocket to the space within the tire.

10. An inflating device for a pneumatic tire comprising a base, a diaphragm adapted for displacement to and from the base, an air pocket between the base and diaphragm, a valve to admit air into the pocket from the atmosphere, means for discharging air from the pocket into a tire, connections attached to the diaphragm and adapted to be secured in a tire at substantially opposite locations relative to the center of the tire tread, said connections being constructed for displacing the diaphragm upon lateral separation by deformation of an under-inflated tire.

11. An inflating device for a pneumatic tire comprising a valve having a base adapted to be arranged within a tire, a diaphragm mounted on the base for displacement relative to the base, an air pocket arranged between the base and the diaphragm, said valve being set in closed position and operating to admit air into the pocket from the atmosphere upon displacement of the diaphragm, means for passing air from the pocket into a tire upon reverse displacement of the diaphragm, connections attached to the diaphragm and adapted to be mounted in a tire at two substantially opposite locations relative to the center of the tire tread, said connections being constructed for air intake displacement of the diaphragm upon relative lateral movement of the connections at the tire.

12. An inflating device for a pneumatic tire comprising a valve having a base adapted to be arranged within a tire, a diaphragm mounted on the base for displacement relative to the base, an air pocket arranged between the base and the diaphragm, said valve being set in closed position and operating to admit air into the pocket from the atmosphere upon displacement of the diaphragm, an open passage from the pocket through the diaphragm for passing air from the pocket into a tire upon reverse displacement of the diaphragm, connections attached to the diaphragm and adapted to be mounted in a tire at two substantially opposite locations relative to the center of the tire tread, said connections being constructed for air intake displacement of the diaphragm upon relative lateral movement of the connections at the tire.

13. In combination, a pneumatic tire for the wheel of a vehicle, an inflating device having means mounted for reciprocatory displacement to effect inflating action, said means being arranged for actuation in one direction of displacement by fluid pressure within the tire, connections between the means and the tire for displacing the means in the other direction by fluid pressure within the tire, said connections being constructed and arranged relative to the tire for actuating the means only during road contact of that portion of tire adjacent to the connections, the means being free for reverse displacement during the remainder of the revolution of the tire.

14. In combination, a pneumatic tire for the wheel of a vehicle, an inflating device having means mounted for reciprocatory displacement to inflate the tire, said means being arranged for displacement in one direction by fluid pressure within the tire, connections attached to the means and including a pair of pressure members adapted to receive the fluid pressure within the tire, said pressure members being arranged at substantially opposite locations relative to the center of the tire tread where deformation of the tire, when under-inflated, on road contact will cause relative lateral displacement of the members.

15. In combination, an inflating device for a pneumatic tire including a base, a diaphragm mounted for displacement relative to the base, an air pocket mounted between the base and the diaphragm, connections attached to the diaphragm including pressure members adapted to be arranged in juxtaposition to the tire casing at substantially opposite locations relative to the center of the tire tread, means for passing air from the air pocket into the tire, and an intake valve arranged to admit air from the atmosphere into the air pocket, said intake valve being adjustable to vary the fluid pressure differential required to open the valve.

HOWARD HENRY PARKER.